US 10,606,281 B2

(12) United States Patent
Wyatt et al.

(10) Patent No.: US 10,606,281 B2
(45) Date of Patent: *Mar. 31, 2020

(54) AUTOMATIC FLIGHT CONTROL SYSTEMS AND METHODS

(71) Applicant: HONEYWELL INTERNATIONAL INC., Morris Plains, NJ (US)

(72) Inventors: Ivan Sandy Wyatt, Scottsdale, AZ (US); Luis Ventura Melendez, Scottsdale, AZ (US); John Koenig, Scottsdale, AZ (US); Jary Engels, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,583

(22) Filed: Nov. 28, 2018

(65) Prior Publication Data

US 2020/0026308 A1  Jan. 23, 2020

Related U.S. Application Data

(63) Continuation of application No. 15/700,416, filed on Sep. 11, 2017, now Pat. No. 10,175,698.

(51) Int. Cl.
  *G05D 1/00* (2006.01)
  *G05D 1/06* (2006.01)

(52) U.S. Cl.
  CPC .............. *G05D 1/0607* (2013.01); *G05D 1/00* (2013.01); *G05D 1/06* (2013.01)

(58) Field of Classification Search
  CPC ...... G05D 1/00; G05D 1/0055; G05D 1/0088; G05D 1/0094; G05D 1/04; G05D 1/042;
  (Continued)

(56) References Cited

U.S. PATENT DOCUMENTS 5,003,305 A * 3/1991 Kelly .................... G01C 23/00
                                                                       244/181
6,262,674 B1   7/2001 Wyatt
                    (Continued)

FOREIGN PATENT DOCUMENTS

WO        2016197140 A1   12/2016

OTHER PUBLICATIONS

Adami, T. M.; et al.; An Energy Management Display for General Aviation Safety Enhancements; 33rd Digital Avionics Systems Conference, Oct. 5-9, 2014.

*Primary Examiner* — Van T Trieu
(74) *Attorney, Agent, or Firm* — Lorenz & Kopf, LLP

(57) ABSTRACT

An aircraft flight control system and method are provided. The system provides a control module that receives inertial data, sensor data, and a target airspeed. The control module processes the received data with aircraft thrust and drag models to evaluate the aircraft energy state. Based on the aircraft energy state, the control module determines (i) a maximum predicted potential flight path "max PPFP", defined by a maximum thrust at the target airspeed, and (ii) an idle predicted potential flight path, "idle PPFP," defined by an idle thrust at the target airspeed. The control module generates display commands for a display system to display (i) the flight path angle, (ii) the max PPFP and (iii) the idle PPFP. In addition, the control module generates and displays a predicted flight path speed indicator (PFPS) when the FPA is above the max PPFP or below the idle PPFP.

19 Claims, 8 Drawing Sheets

(58) Field of Classification Search
CPC ........ G05D 1/06; G05D 1/0607; B64D 43/00;
B64D 43/02; G01C 23/005
See application file for complete search history.

(56) References Cited

U.S. PATENT DOCUMENTS

| | | |
|---|---|---|
| 9,061,756 B2 | 6/2015 | Jang et al. |
| 9,193,442 B1 * | 11/2015 | Young .................... B64C 19/00 |
| 9,815,566 B1 | 11/2017 | Innis |
| 10,175,698 B1 * | 1/2019 | Wyatt .................. G05D 1/0607 |
| 2013/0060466 A1 | 3/2013 | Gurusamy |
| 2015/0045989 A1 | 2/2015 | Polansky |

* cited by examiner

AUTOMATIC FLIGHT CONTROL SYSTEMS AND METHODS

CROSS-REFERENCE TO RELATED APPLICATIONS

This Application is a continuation of and claims priority to U.S. patent application Ser. No. 15/700,416 filed Sep. 11, 2017, and entitled "AUTOMATIC FLIGHT CONTROL SYSTEMS AND METHODS," which is incorporated by reference in its entirety.

TECHNICAL FIELD

The present invention generally relates to vehicle display systems, and more particularly relates to utilizing aircraft energy state information in aircraft automatic flight control systems (AFCS) and methods.

BACKGROUND

Aircraft systems continue to advance in sophistication, particularly with respect to aircraft display systems. Flight instruments and associated displays are used on aircraft to integrate information from data sources and to perform, or assist a user in performing, functions related to, for example, flight planning, guidance and navigation, and performance management. The easier it is for the pilot to obtain and understand the information provided by these instruments and displays, the more likely that the pilot will be able to successfully fly the aircraft.

Conventional AFC Systems generally includes both Autopilot (AP) and Auto-Throttle (A/T) speed control functions. For A/T speed control, the AFC System manages engine thrust. In contrast, in AP speed control, the AFC System controls aircraft's speed by managing the vertical path of the aircraft. In some scenarios, there may be pilot confusion regarding whether the aircraft's speed is being controlled by A/T or by the autopilot. Although conventional AFCS are common in aircraft, any improvement that enhances a pilot's situational awareness and control of the aircraft is beneficial.

Accordingly, it is desirable to provide improved aircraft AFC systems and methods. Specifically, AFC systems and methods that provide enhanced speed control information are desirable. The desirable enhanced AFC system and method enable a pilot to readily understand the aircraft's energy state, and interactions and limitations of AP and A/T speed control modes. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for providing flight path angle (FPA) information on a primary flight display (PFD) of an aircraft, the method comprising: receiving, from a user interface, a target airspeed; receiving, from a navigation system, navigation data comprising a flight path angle, attitude, and airspeed; receiving, from on-board sensors, sensor data comprising environmental data and engine thrust status; at a control module, processing the navigation data, the sensor data, and the target airspeed, to determine (i) a maximum predicted potential flight path (max PPFP), defined by a maximum thrust at the target airspeed, and (ii) an idle PPFP, defined by an idle thrust at the target airspeed; and commanding the PFD to render, (i) the flight path angle, and (ii) a first symbol that represents the max PPFP and a second symbol that represents the idle PPFP.

Also provided is an aircraft flight control system for use with a primary flight display (PFD), the system comprising: on-board sensors for providing sensor data comprising environmental data and sensed engine thrust data; a navigation system for providing inertial data comprising a flight path angle, attitude, and airspeed; a control module comprising a processor and a memory, the control module configured to: receive the sensor data; receive the inertial data; receive a target airspeed; process the inertial data, the sensor data, and the target airspeed, to determine (i) a maximum potential flight path (max PPFP), defined by a maximum thrust at the target airspeed, and an idle PPFP, defined by an idle thrust at the target airspeed; and generate display commands associated with (i) the flight path angle, (ii) the max PPFP and (iii) the idle PPFP; and a primary flight display (PFD) coupled to the control module and configured to receive the display commands and selectively render the flight path angle, a first symbol that represents the max PPFP, and a second symbol that represents the idle PPFP.

Another method for an aircraft flight control system for use with a primary flight display (PFD) is provided, the method comprising: at a control module, receiving sensor data comprising environmental data and sensed engine thrust data, from on board sensors; receiving navigation data comprising a flight path angle, attitude, and airspeed, from a navigation system; receiving a target airspeed; processing the navigation data, the sensor data, and the target airspeed, to determine (i) a maximum potential flight path (max PPFP), defined by a maximum thrust at the target airspeed, (ii) an idle PPFP, defined by an idle thrust at the target airspeed; generating display commands associated with (i) the flight path angle, (ii) the max PPFP and (iii) the idle PPFP; and at a primary flight display (PFD), receiving the display commands and selectively rendering the flight path angle, a first symbol that represents the max PPFP, and a second symbol that represents the idle PPFP, responsive to the display commands.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

Figure 1:
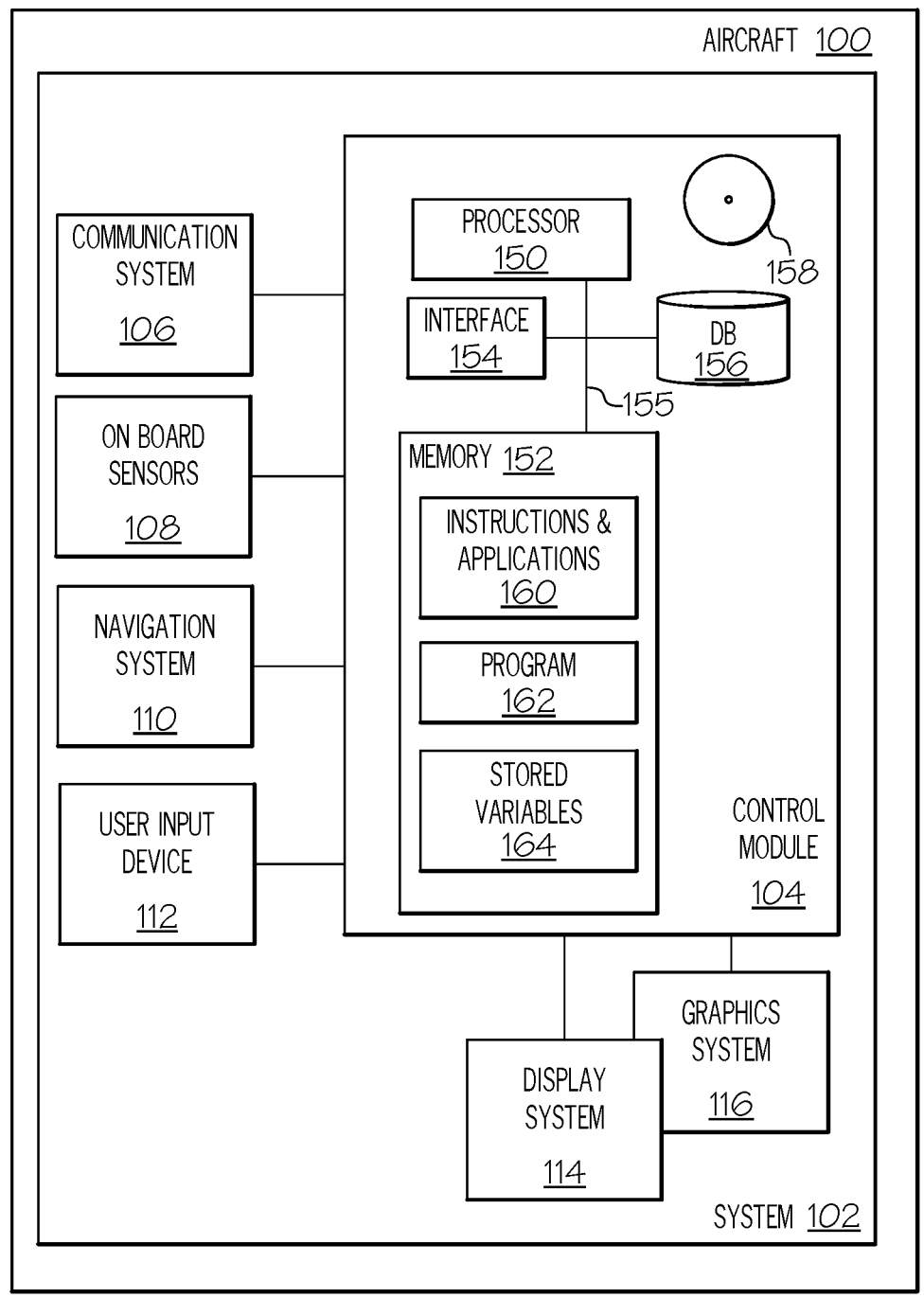
FIG. 1 is a block diagram of an aircraft system for an enhanced AFCS, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), within an aircraft system (FIG. 1, 102), and may be separate from, or integrated within, a preexisting mobile platform management system, electronic flight information system (EFIS) or aircraft flight control system (FCS).

Exemplary embodiments of the disclosed control module 104 employ a novel Predictive Flight Level Change (P-FLC) control scheme to thereby deliver an enhanced AFCS. The novel P-FLC control scheme, implemented as a method and system, utilizes aircraft energy state information to realize a new "auto-FPA mode" for the AFCS, provides insight into current aircraft speed control, and provides associated new indicators for display (in the form of symbology elements and annunciations). Functionally, the new indicators provided by the P-FLC control scheme reveal to the pilot the basic underlying physical parameters and interconnecting relationships between thrust, drag, airspeed, flight path and acceleration. This enables the pilot to easily understand the current activities and current limitations of an A/T automatic speed mode. In the described embodiments, the P-FLC control scheme is applied to a Primary Flight Display (PFD) providing legacy FPA symbology, such as a legacy flight path vector and a legacy Flight Path Angle (FPA) Symbol. The legacy FPA symbology was first created for Head-Up Display (HUD) systems and has in recent years migrated to Synthetic Vision Heads-Down PFD's. In the described embodiments, the depicted aircraft system 102 for an enhanced AFCS is generally realized as an aircraft flight deck display system within an aircraft 100; however, the concepts presented here can be deployed in a variety of mobile platforms, such as rotorcraft, spacecraft, and the like.

Turning now to FIG. 1, a functional block diagram of an aircraft 100 including an aircraft system 102 for an enhanced AFCS is depicted, in accordance with various exemplary embodiments. The aircraft system 102 includes the control module 104. The control module 104 performs the functions of the aircraft system 102. The novel Predictive Flight Level Change (P-FLC) control scheme in the control module 104 provides technological improvements over conventional AFCS with at least these features: (1) an Auto-FPA mode, (2) speed control information, and (3) a novel vertical speed indicator. Additionally, the control module 104 generates new display symbols: (1) Predicted Potential Flight Path (PPFP) indicators, (2) a Predicted Flight Path Speed (PFPS, simplified to PS) indicator, and (3) a calculated vertical speed from a commanded FPA. The annunciations and new symbology elements generated by the control module 104 are displayed on the PFD (see, for example, FIGS. 2, 251, 252, 253, and 2, described in more detail below). In the following, these features are functionally described and then figures are referenced for further explanation.

Auto-FPA mode is a re-imagining of the conventional "Flight Level Change" (FLC) mode. The novel Auto-FPA mode reduces pilot confusion and provides better predictability and visualization over the conventional FLC mode. As mentioned, the Auto-FPA mode utilizes aircraft energy state information to determine a maximum PPFP 251 and an idle PPFP 253, and controls the aircraft 100 when climbing and descending by intelligently adjusting the target FPA to a performance value related the maximum PPFP 251 and idle PPFP 253. In some embodiments, Auto-FPA mode may be implemented in climb only, and not in descents. In implementation of the novel Auto-FPA mode, the P-FLC control scheme also provides speed control information. As mentioned, in AFCS systems that include both AP and A/T speed control functions, there are generally two airspeed control schemes:

Speed-On-Elevator; in the Speed-On-Elevator mode, aircraft speed is controlled by a pilot varying the vertical path of the aircraft 100 while maintaining the thrust constant.

Speed-On-Throttle; in Speed-On-Throttle mode, the aircraft's speed is controlled by the throttle, within the power limits of the aircraft's 100 engines.

In the provided P-FLC control scheme, generally, when the A/T system is active, the aircraft speed is, by default, controlled by the aircraft engine throttles (A/T). However, there are certain "limit" scenarios that deviate from this, such as, when the pilot flies outside of the capabilities of the engines to produce sufficient thrust in a climb (thus exceeding max PPFP 251, indicated by a first symbol), or in a steep dive in which the aircraft accelerates even at idle thrust (thus exceeding the idle PPFP 253 on the low side, indicated by a second symbol). In addition, there are operational procedures such as takeoff and go-around that require maximum thrust to ensure climb (CLB) performance. In these and similar "limit" scenarios, the pilot overrides the default, and maneuvers the aircraft 100 beyond the capabilities of the throttles, to maintain speed in either climbs or descents. The novel P-FLC control scheme implemented by the control module 104 provides the crew with important insights to the real-time status, authority and capabilities of the aircraft engines and the A/T system, as well as their interactions with the AFCS vertical modes (FPA, Auto-FPA, etc.).

Accordingly, the control module 104 determines when (a) the FPA 5 is greater than the max PPFP 251, and when (b) the FPA 5 is less than the idle PPFP 253; the control module 104 commands the PFD to render a third symbol, PS 2, on an airspeed indicator 202 selectively responsive to the conditions (a) and (b). In other words, when the FPA 5 is greater than the max PPFP 251, it generates display commands to display a respective PS 2, and when the FPA 5 is less than the idle PPFP 253, it generates display commands to display a respective PS 2.

The novel P-FLC design also determines a vertical speed associated with a commanded FPA. There are Air Traffic Control (ATC) clearances that require the pilot to maintain a minimum vertical speed (VS) for a short time. There are also ATC clearances that require the aircraft to reach a specific altitude in a specific time. To aid the pilot to comply with these categories of ATC clearances while utilizing the FPA or new Auto-FPA mode, a "FPA Vertical Speed" (VS 10) indicator is placed on the vertical speed indicator scale 204 to indicate the vertical speed associated with the commanded FPA or Auto-FPA. The FPA Vertical Speed VS 10 is not constant for a given FPA and will vary with the ground speed or true airspeed.

With reference again to FIG. 1, components of the aircraft system 102 are further described. In various embodiments, the control module 104 is operationally coupled to a communication system 106, on-board sensors 108, a navigation system 110, a user input device 112, a display system 114, and a graphics system 116. The operation of these functional blocks is described in more detail below.

The communications system 106 is configured to support communications between external data source(s) and the aircraft. External source(s) may comprise air traffic control (ATC), or other suitable command centers and ground locations. In this regard, the communications system 106 may be realized using a radio communication system or another suitable data link system.

The on-board sensors 108 may be any one of or combination of existing sensors for sensing environment and engine status data. Specifically, the on-board sensors 108 may comprise sensors for sensing or detecting temperature, weather, fuel status, engine status, landing gear status, throttle status, altitude, attitude, heading, roll-angle, pitch-angle, etc. Accordingly, sensor data from the on-board sensors 108 may comprise current environmental data and current engine thrust status.

Navigation system 110 is configured to provide real-time navigational data and/or information regarding operation of the aircraft. The navigation system 110 may be realized as a flight management system (FMS), global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth. Navigation system 110 is the source of navigation data comprising, at least, a flight path angle, attitude, and airspeed to the control module 104.

The user input device 112 is coupled to the control module 104, and the user input device 112 and the control module 104 are cooperatively configured to allow a user (e.g., a pilot, co-pilot, or crew member) to interact with the display system 114 and/or other elements of the aircraft system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, receiving target airspeeds and vertical path inputs, and loading and updating the contents of the database 156, each described in more detail below.

The control module 104 is configured to generate display commands that command and control the renderings of the display system 114. The conversion of display commands may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations associated with operation of the aircraft 100, as described in greater detail below.

Within the control module 104, the processor 150 and the memory 152 (having therein the program 162) form a processing engine that performs the described processing activities in accordance with the novel rules and algorithm embodied in the program 162, as is described in more detail below. The control module 104 also includes an interface 154, communicatively coupled to the processor 150 and memory 152 (via a bus 155), database 156, and an optional storage disk 158. In various embodiments, the control module 104 performs actions and other functions in accordance with steps of a method 800 described in connection with FIG. 8. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In various embodiments, the memory 152 comprises the above-referenced instructions and applications 160 along with one or more configurable variables in stored variables 164. The memory 152 may also comprise environmental data (such as atmospheric model), aircraft data (such as weight class, type, engine information, and the like), thrust models, and drag models, sufficient to selectively determine the max PFP 251 (FIG. 2) and the idle PFP 253 (FIG. 2) based on received on-board sensor data, or experimentally. The database 156 and the disk 158 are computer readable storage media in the form of any suitable type of storage apparatus, including direct access storage devices such as hard disk drives, flash systems, floppy disk drives and optical disk drives. Information in the database 156 may be organized or imported during an initialization step of a process (see initialization 802 FIG. 8).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. The interface 154 may also include one or more network interfaces to communicate with technicians, and/or one or more storage interfaces to connect to storage apparatuses, such as the database 156.

It will be appreciated that the aircraft system 102 may differ from the embodiment depicted in FIG. 1. The aircraft system 102 may be integrated with an existing flight management system (FMS) Flight control system (FCS), or cockpit display in the aircraft 100.

During operation of the aircraft system 102 and control module 104, the processor 150 loads and executes one or more programs, algorithms and rules embodied as instructions and applications 160 contained within the memory 152 and, as such, controls the general operation of the control module 104 as well as the aircraft system 102. In executing the process described herein, such as the method 800 of FIG. 8, the processor 150 loads and specifically executes the program 162, to thereby realize an unconventional technologically improved Automatic Flight Control System (AFCS). Additionally, the processor 150 is configured to process received inputs (any combination of the input provided via user input device 112, on-board sensors 108, and navigation system 110), reference the database 156 in accordance with the program 162, process received inputs with stored engine thrust models and stored engine drag models, and generate display commands to command and control the display system 114 based thereon. The processor 150 evaluates the aircraft energy state based on the received inputs, determines symbology for display therefrom, and generates associated display commands.

The processor 150 evaluates the aircraft energy state based on the received inputs and determines the max PPFP 251 and idle PPFP 253 therefrom. If the FPA 5 is greater than the max PPFP 251, or if the FPA 5 is less than the idle PPFP 253, the flight path speed indicator PS 2 is also generated. The control module 104 is configured to generate display commands subsequent to determining max PPFP 251, idle PPFP 253, PS 2, and VS 10.

Responsive to received display commands, the display system 114 renders a new image or modifies an existing image on the PFD. In the described embodiment, the various "indicators" are symbols that are overlaid on an image on the PFD of display system 114. The various annunciations may be selectively displayed as alphanumeric symbology in a text box and/or be emitted by an audio source. Exemplary display images in FIGS. 2-7 depict the novel symbols and annunciations selectively overlaid on a PFD with various legacy symbols present.

Figure 2:
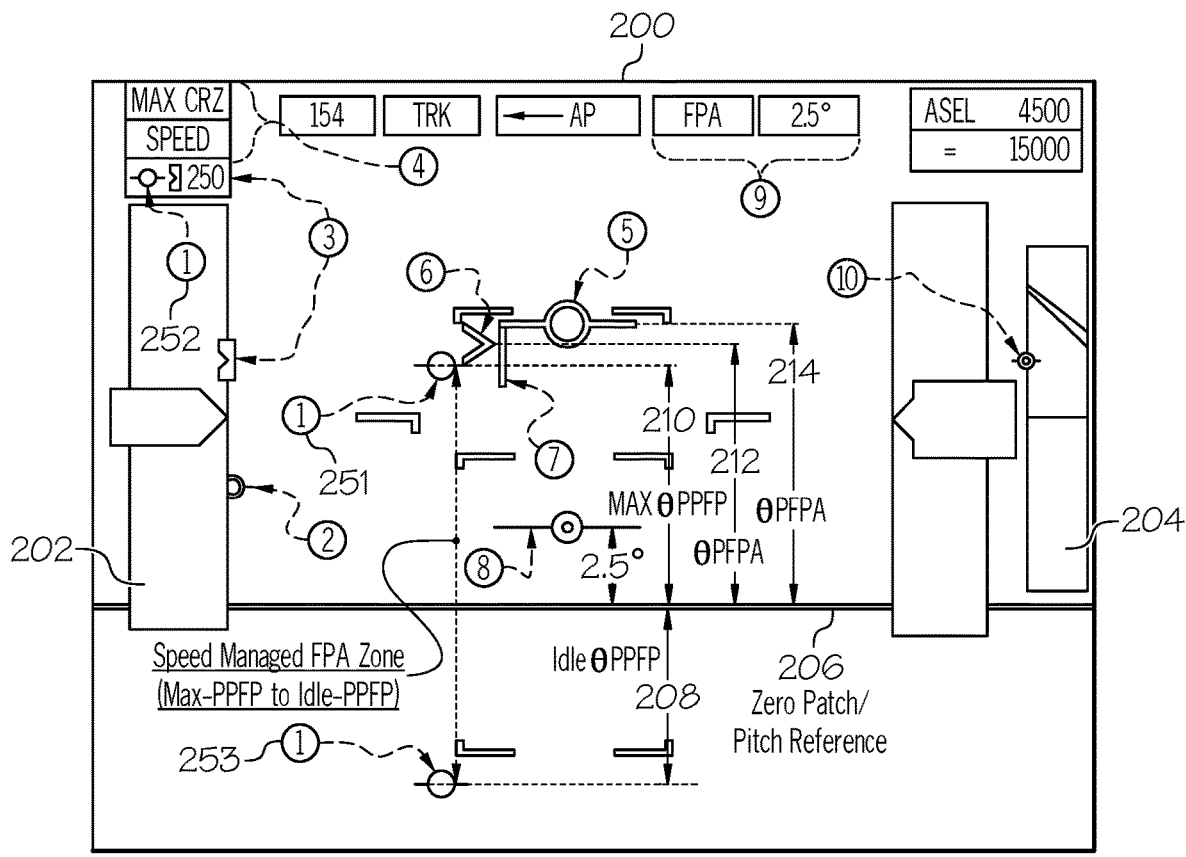
FIG. 2 is an image on a PFD generated by the aircraft system of FIG. 1, in accordance with an exemplary embodiment.

FIG. 2 provides a simplified image 200 of a Primary Flight Display (PFD), with legacy symbols and with the novel enhancements (display symbols and parameters) provided by the control module 104. Active speed targets are depicted at 3. The flight path angle (FPA 5) symbol is depicted, and a potential flight path angle (PFPA 6, or the "acceleration chevron") is depicted. The speed error tape 7, a flight director symbol 8, an Automatic Flight Control System (AFCS) vertical mode and mode target are depicted at 9. The number of degrees 212 of the potential flight path angle is shown. The flight path angle 214 is also shown, in degrees. The airspeed indicator scale 202, the vertical speed indicator scale 204, and the zero pitch reference 206 are also shown.

Enhancements provided by the control module 104 include: A predicted potential flight path (PPFP) indicator, which is depicted as an open circle in three places (max PPFP 251, 252, and idle PPFP 253), and a predicted flight path speed indicator (PFPS, simplified to PS 2). Also shown is an idle PPFP 208, in degrees, and, a max PPFP 210, in degrees. In addition, the control module 104 may command the display of an A/T modes and annunciations in a designated area referred to as layout 4; the layout 4 includes an area in the upper left corner of PFD 200 that is comprised of two separate designated areas, lines (310 and 312). The first line, the A/T mode 310 is used to convey text reciting either the active "SPEED" mode or an active "thrust limit indication." In the exemplary embodiment, the thrust limit indications are shown in amber, and become active when the A/T system cannot control the airspeed due to excessive FPA. As used herein "well above" means more than a configurable predetermined upper margin above the max PPFP, "well below" means more than a configurable predetermined lower margin below the idle PPFP, and an excessive FPA is one that is either well above the max PPFP or well below the idle PPFP. In an embodiment, the configurable upper margin is 5% and the configurable lower margin is also 5%, but in other embodiments, they may vary, and in some embodiments, they may not be equal to each other. A/T SPEED is the primary mode in the P-FLC design, and is always automatically, or by default, armed. There are other minor modes, such as retard (RTR, Table 1, below) that activate automatically in specific conditions.

The second line, status annunciations 312, shows advisory and status messages In a third line, the Armed SPEED A/T mode may also be shown. In an embodiment, status annunciations (CLB, MAX CLB, CRZ, MAX CRZ and IDLE) may be rendered in white, against a background of a color other than white, and indicate the high and low limits of throttle movement or engine thrust. Status annunciations 312 may also be blank. In Table 1, below, and the corresponding figures, examples and scenarios are provided to demonstrate the relationships between the FPA 5, max PPFP 251, idle PPFP 253, and the A/T modes 310.

Figure 3:
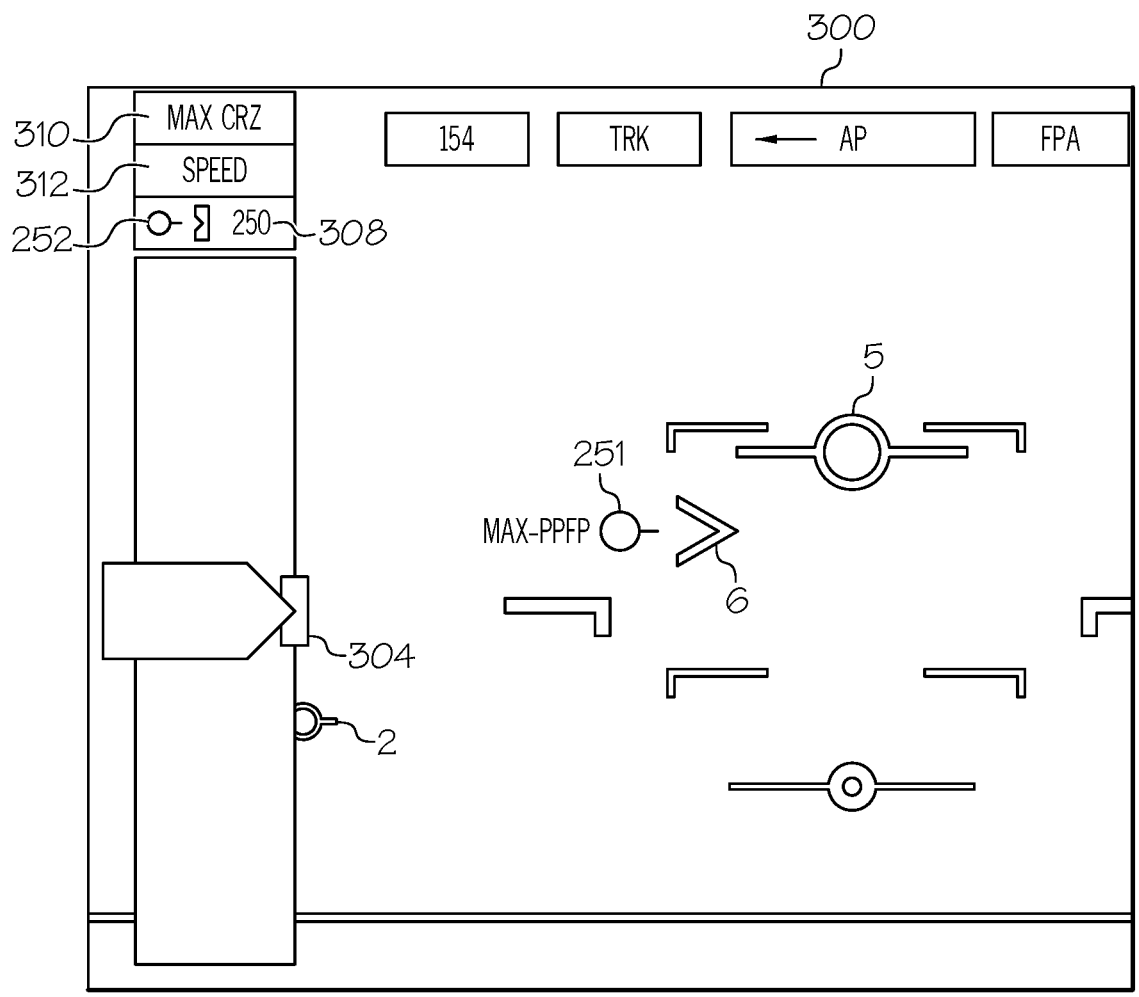
FIGS. 3-4 are enlarged partial views of an image on a PFD, in accordance with an exemplary embodiment.

An enlarged portion of FIG. 2 is shown at 300 (FIG. 3) and 400 (FIG. 4), for discussion of some of the novel display symbols and parameters provided by the control module 104. In FIG. 3, the FPA 5 is shown above the max PPFP 251, which is one scenario in which the aircraft energy state indicates that there is insufficient thrust to maintain 250 knots at the high FPA 5. In this scenario, the control module 104 causes PS 2 to be displayed on the airspeed indicator 202. PS 2 indicates the steady-state airspeed if the FPA 5 is held constant at its present value at maximum thrust. The target airspeed is 250 knots (depicted with 308 and marker 304), and the PS 2 is lower than marker 304 on the airspeed indicator 102. Therefore, PFD 300 visually communicates to the pilot the current energy state of the aircraft 100, which is that there is insufficient thrust to maintain 250 knots at the high FPA 5.

As a result of insufficient thrust to maintain 250 knots at the high FPA 5, the A/T mode 310 displayed is "MAX CRZ," and the associated armed mode annunciation 312, is "SPEED." These lines are rendered in a visually distinguishable manner from other alphanumeric renderings on the PFD 300. For example, alphanumeric information in the A/T mode 310 may be selectively rendered against a green background to indicate that it is active, or against an amber background to indicate thrust control limitations. Correspondingly, alphanumeric information in the associated annunciation 312, may be rendered against a cyan background to indicate an "armed" state, or rendered as white text to indicate status messages. A pilot may respond to seeing the display of this "A/T mode 310" and "annunciation 312" information by adjusting target airspeed 308.

Figure 4:
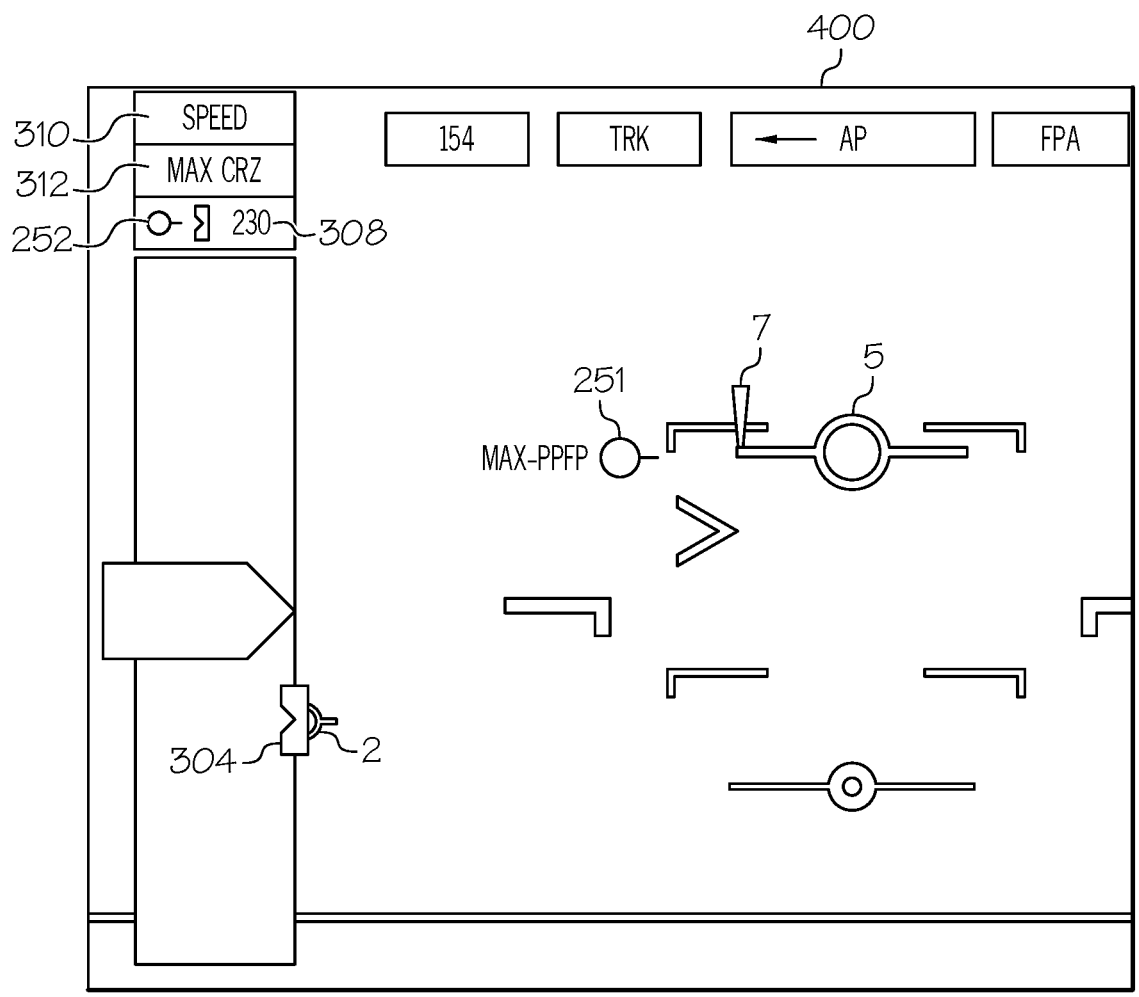

FIG. 4 represents the PFD 400 rendered, modified, or updated at a moment in time after a pilot response to PFD 300. Referring to FIG. 4, PFD 400 indicates that the target speed 308 has been adjusted by the pilot down to 230 knots, shown extending from the initial (250 knots) location to the adjusted target airspeed 308 (230 knots) location. Responsive to an adjustment in target airspeed 308, the control module 104 recalculates the max PPFP 251 using the 230 knot airspeed, and updates the rendering on the PFD 400 to show the recalculated max PPFP 251 at its new location. The A/T mode 310 is updated to an alphanumeric display stating "SPEED," and the associated annunciation 312 is updated to an alphanumeric display stating "MAX CRZ," indicating that throttles are near their limit for the current phase of flight (cruise).

Figure 5:
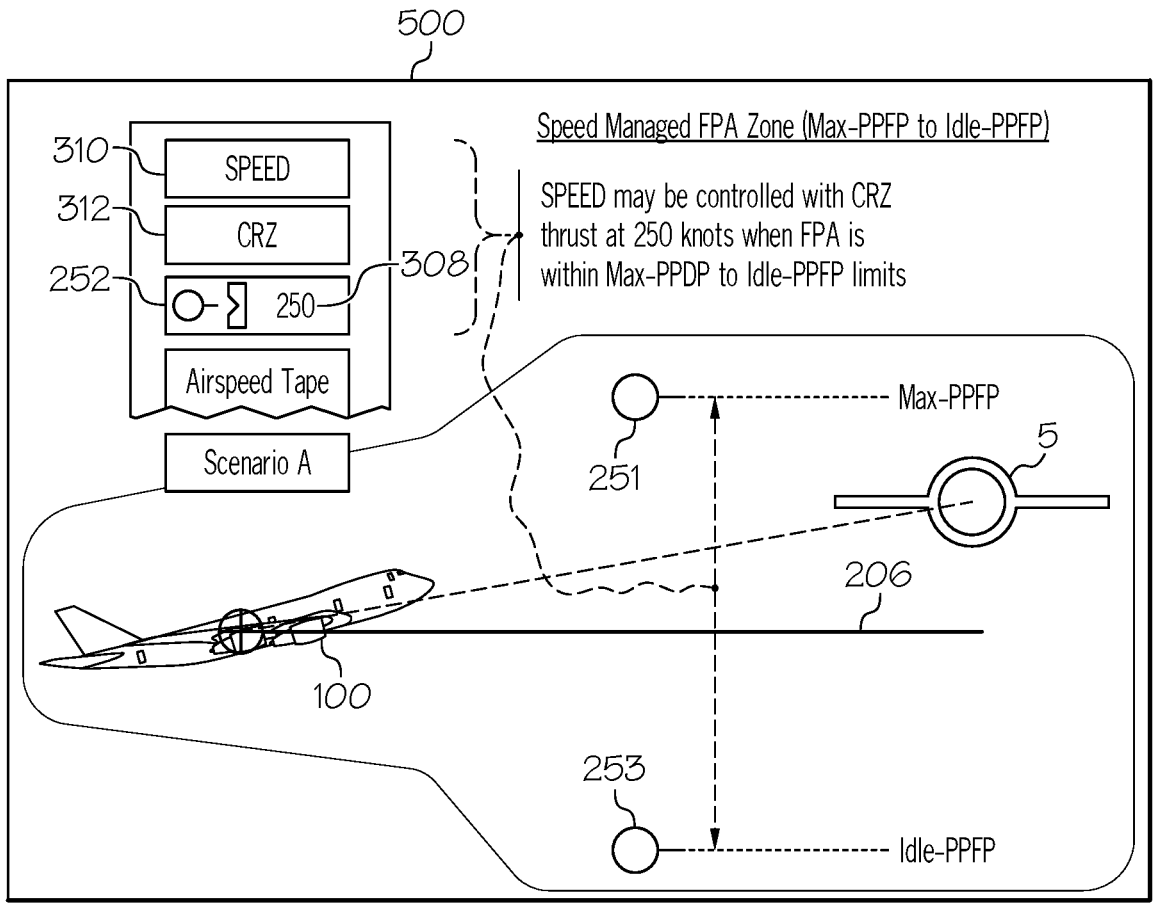
FIGS. 5-6 depict various flight scenarios for discussion of provided indicators, in accordance with and exemplary embodiment.
Figure 6:
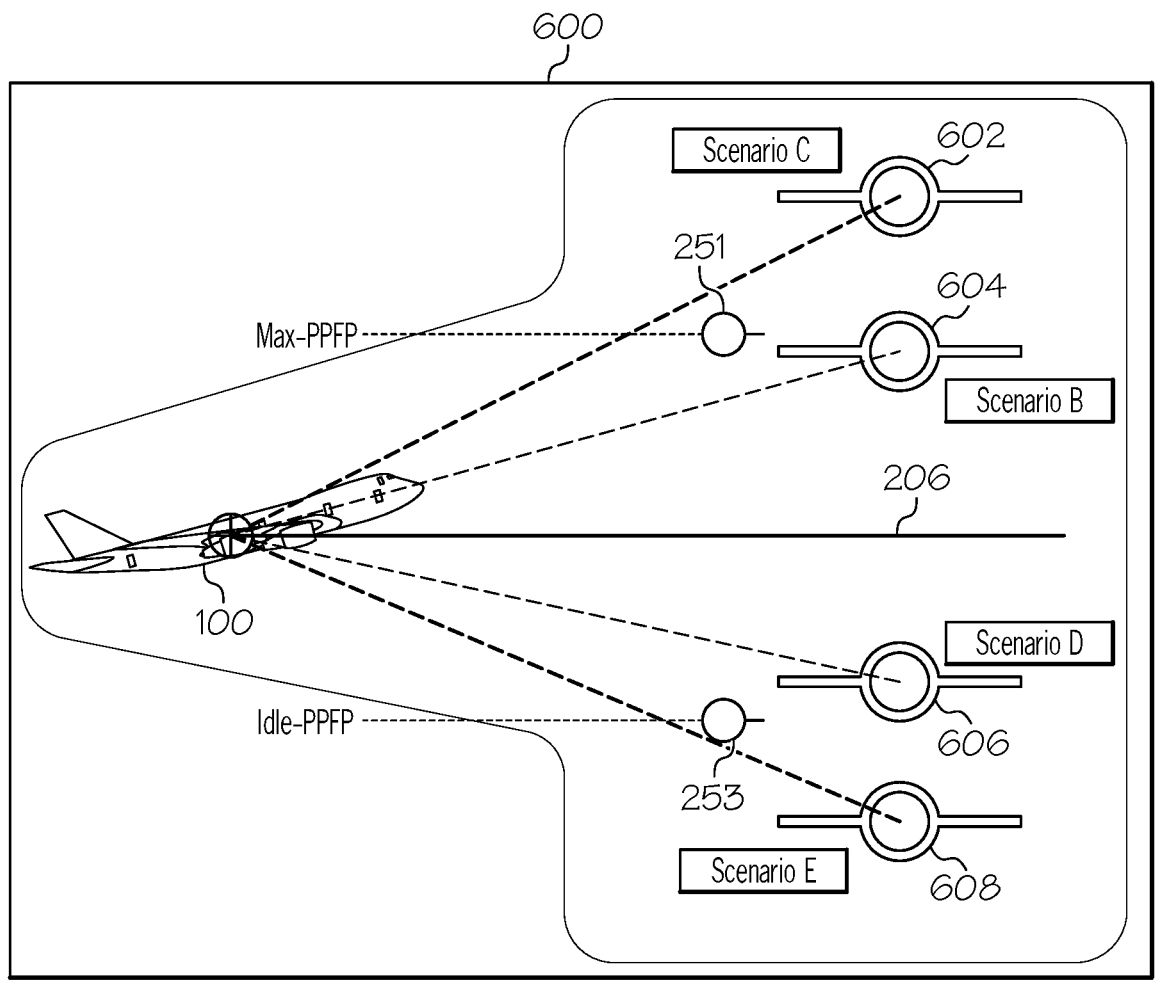

The control module 104 is continually receiving and processing inputs from systems in operable communication (FIG. 1), therefore the aircraft energy state is continually being evaluated. In addition to the above example scenario, the novel P-FLC control scheme provides new information in a variety of other aircraft energy state scenarios. FIGS. 5-6 provide example scenarios for discussion in connection with Table 1 below. An FPA 5 range bounded by a max PFP 251 on the high side and by idle PFP 253 on the low side may be referred to as a speed managed FPA zone, and the novel P-FLC control scheme makes energy state determinations based thereon. As is observable, the speed managed FPA zone extends above and below the zero pitch reference line 206.

TABLE 1

Figure 7:
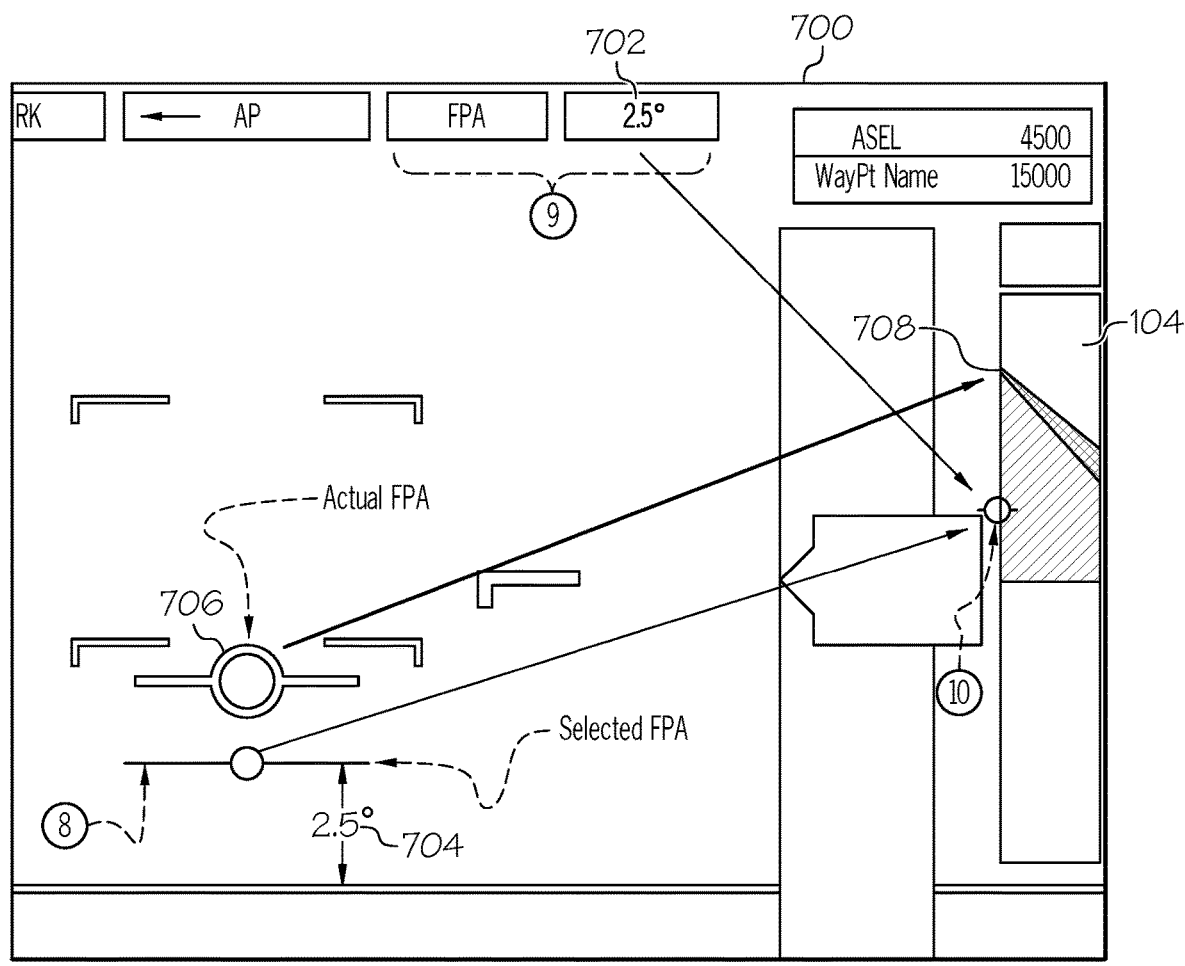
FIG. 7 depicts a novel vertical speed indicator generated by the aircraft system of FIG. 1, in accordance with an alternate exemplary embodiment.

| | Line 1 310 | Line 2 312 | 252 present? | 308 Value | DESCRIPTION |
|---|---|---|---|---|---|
| 1 | SPEED | CRZ | y | 250 | Scenario A (FIG. 5), The FPA is between the Max and Idle PPFP, i.e. in the "Speed Managed Zone." Aircraft speed is being well controlled by the A/T system in "SPEED" mode. The engine thrust is in cruise (CRZ). Target airspeed is set in Manual 250 knots. |
| 2 | SPEED | MAX CRZ | n | — | Scenario B (FIG. 6, 604), The FPA is near but not above the Max PPFP. Speed is managed by A/T system, but the thrust is at or near MAX CRZ. |
| 3 | SPEED | IDLE | n | — | Scenario D (FIG. 6, 606), The FPA is near but not below the Idle PPFP. Speed is managed by A/T system, but the thrust is at or very near idle. |
| 4 | MAX CRZ | SPEED | n | — | Scenario C (FIG. 6, 602), The FPA is well above the Max PPFP. Speed cannot be managed by A/T system, thrust is at MAX CRZ. The "SPEED" mode is armed and will transition to active when FPA is reduced to be within the Speed Managed Zone. |
| 5 | IDLE | SPEED | n | — | Scenario E (FIG. 6, 608), The FPA is well below the Idle PPFP. Speed cannot be managed by A/T system, thrust is at IDLE and speed is increasing. The "SPEED" mode is armed and will transition to active when FPA is within the Speed Managed Zone. |
| 6 | SPEED | CLB | y | 250 | Similar to scenario A, except; engines are using climb (CLB) thrust, and the target airspeed is set by Auto-Speed to 250 knots. |
| 7 | SPEED | MAX CLB | n | — | Similar to scenario B, except; engines are using climb (CLB) thrust. |
| 8 | MAX CLB | SPEED | n | — | Similar to scenario C, except; engines are using climb (CLB) thrust. |
| 9 | — | MAX T/O | y | 128 | This is a takeoff sequence with Thrust Mode MAX T/O armed, then active above 400', then transitioning to SPEED control with T/O airspeed target 190 knots according to the specific OEM logic. |
| 10 | MAX T/O | SPEED | y | 128 | |
| 11 | SPEED | CLB | y | 190 | |
| 12 | RTR | IDLE | n | — | The throttles are being retarded toward idle when landing. | the PS 2 value (304 and PS 2 are shown side by side). To indicate the reduction in speed, the speed error tape 7 is Using sensed ground speed, FIG. 7 shows the relationship between the FPA Vertical Speed and the selected FPA/

AUTO-FPA value. The flight director symbol 8 represents a commanded FPA 9, which is 2.5 degrees (distance 704) from the zero pitch reference line 206. The actual FPA 706 is in a different location than the commanded FPA 9. An indicator for FPA Vertical Speed VS 10 is associated with the flight director symbol 8 and target FPA 9. Notably, VS 10 is not related to the actual current flight path angle 706 being flown. The actual current flight path angle 706 is associated with a point 708 on the vertical speed indicator scale 204.

It is to be understood that details of symbology or location of markings on the display system 114 images may change form and location from embodiment to embodiment, and from display system 114 to display system 114. Specifically, the symbols used to represent the novel new concepts provided herein may be rendered in any suitable color, transparency, and outline to be visually distinguishable to a pilot from other symbols on the PFD, and to enhance situational awareness. Further, the provided indicators and symbols may comprise color attributes.

Figure 8:
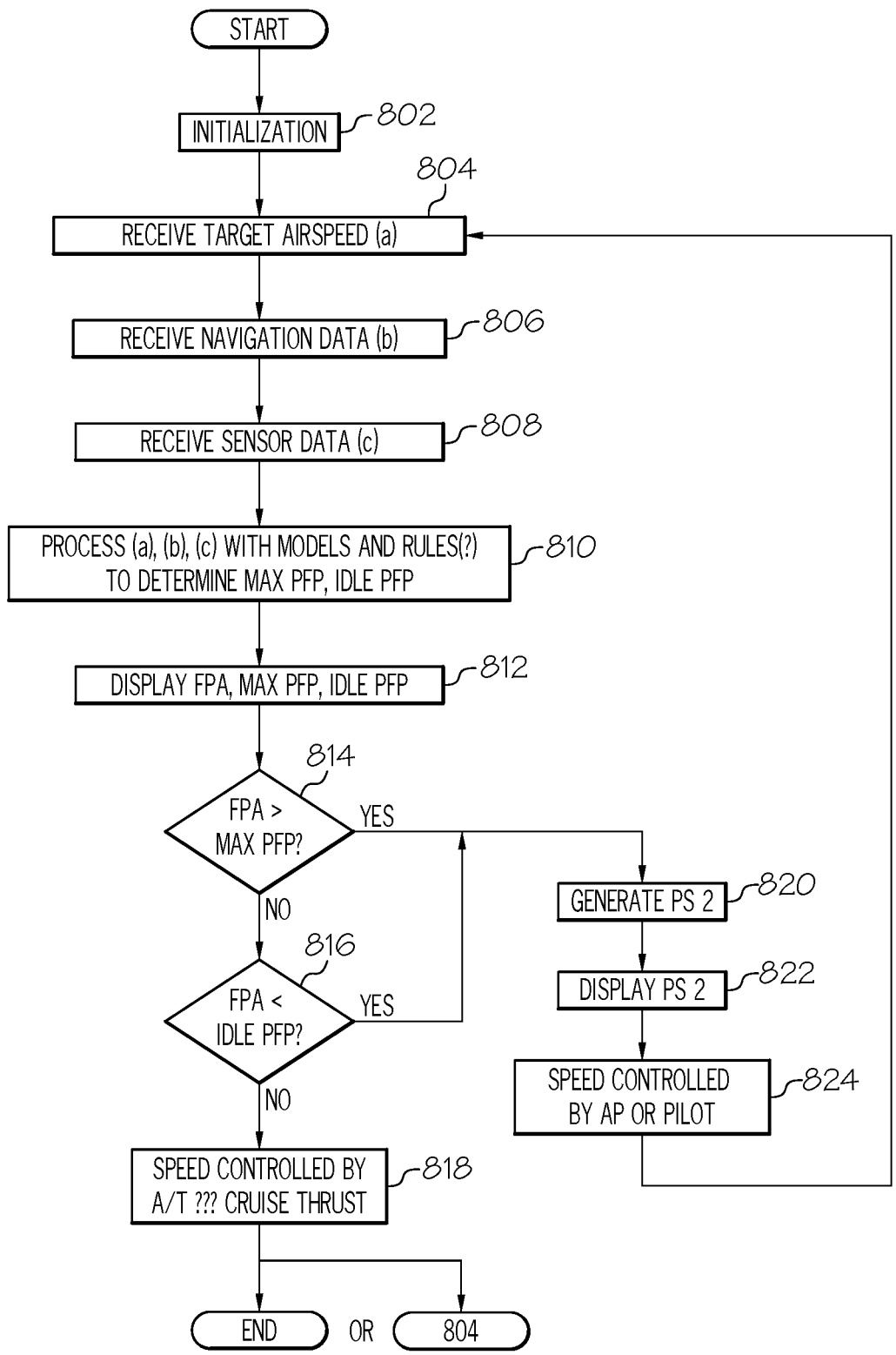
FIG. 8 is a flow chart for a method for an aircraft system for an enhanced AFCS, in accordance with a further exemplary embodiment.

In a further exemplary embodiment, the aircraft system 102 discussed above may be used to implement a method 800 for an aircraft system 102, as shown in the flow chart of FIG. 8. For illustrative purposes, the following description of method 800 may refer to elements mentioned above in connection with FIG. 1. In practice, portions of method 800 may be performed by different components of the described system. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 as long as the intended overall functionality remains intact.

The method starts, and at 802 the control module 104 is initialized. As mentioned above, initialization may comprise uploading or updating instructions and applications 160, program 162, stored variables 164, and the various lookup tables stored in the database 156. Generally, program 162 comprises the novel rules and algorithm used to perform the functions described herein; including rules for interacting with the engine thrust and engine drag models. Generally, predetermined variables include, for example, values used in engine thrust models, values used in engine drag models, and various shapes and various colors and/or visually distinguishing techniques used for the symbology. In some embodiments, the program 162 includes additional instructions and rules for rendering information differently based on type of display device in display system 114.

At 804, a target airspeed is received. Target airspeed may be received from a pilot or user, via the user input device 112. As the method 800 operates, it may return through 804 again, if a different target airspeed is received on a second pass through 804, it may be referred to as the second target airspeed, and so on. At 806, navigation data is received. Navigation data comprises at least a current flight path angle (FPA), a current attitude, and a current actual airspeed. Sensor data is received at 808. Sensor data is continually being detected by on-board sensors, and represents current environmental data as well as current engine status data (for example, the status and maximum and idle thrust capability of the aircraft's engine thrust system and throttles).

At 810, the target airspeed, navigation data, and sensor data are processed with models and rules to determine a max PPFP 251 and an idle PPFP 253. At 812, the FPA 5, the max PPFP 251, and the idle PPFP 253 are displayed on the PFD.

At 814 the FPA 5 is compared to the max PPFP 251 and at 816, the FPA 5 is compared to the idle PPFP 253. At 814, it is determined whether (a) the FPA 5 is greater than the max PPFP 251, and at 816 it is determined whether (b) the FPA 5 is less than the idle PPFP 253. At 818, the FPA 5 is determined to be within the zone in which the aircraft speed may be controlled by the A/T system in an active "SPEED" mode, at a cruise thrust. Selectively, in response to either (a) or (b), (i.e., when the FPA 5 is outside of the speed control zone) the method 800 determines, at 820, an associated predicted speed PS 2, and commands, at 822, the display system to render a third symbol (PS 2) on the airspeed indicator tape 202 on the PFD.

At 824, when the FPA 5 is outside of the A/T speed control zone, the aircraft speed is controlled by the pilot or AP. When the PFD is updated with symbology to indicate that the current aircraft energy state exceeds the requirements for A/T controlled aircraft speed, a pilot may be prompted to enter a second target airspeed at 804, starting the process again. In addition, at any time in the method 800, the VS 10 may be generated and displayed on the PFD.

Accordingly, the exemplary embodiments discussed above provide enhanced AFC systems and methods that utilize aircraft energy state information to provide additional symbology and annunciations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing flight path angle (FPA) information on a primary flight display (PFD) of an aircraft, the method comprising:
   receiving, from a user interface, a target airspeed;
   receiving, from a navigation system, navigation data comprising a flight path angle, attitude, and airspeed;
   receiving, from on-board sensors, sensor data comprising environmental data and engine thrust status;
   at a control module,
      processing the navigation data, the sensor data, and the target airspeed, to determine (i) a maximum predicted potential flight path (max PPFP), defined by a maximum thrust at the target airspeed, and (ii) an idle predicted potential flight path (idle PPFP), defined by an idle thrust at the target airspeed;
      commanding the PFD to render symbolic indicators for, (i) the flight path angle, and (ii) a first symbol that represents the max PPFP and a second symbol that represents the idle PPFP;
      determining, when the max PPFP is greater than the FPA, and the FPA is greater than the idle PPFP, that the aircraft is in a speed controlled zone; and
      commanding the PFD to display an indicator of an auto-throttle (A/T) mode in a first designated area, and a status annunciation in a second designated area, when the aircraft is in the speed controlled zone.

2. The method of claim 1, further comprising, at the control module, when the aircraft is in the speed controlled zone:
   determining that the A/T mode is active and the indicator for the A/T mode is an indication for speed; and
   determining that the status annunciation is an indicator for cruise.

3. The method of claim 2, further comprising:
   at the control module,
   determining when the FPA is more than a configurable predetermined upper margin above the max PPFP; and
   when the FPA is more than a configurable predetermined upper margin above the max PPFP,
      determining a predicted speed (PS) associated with the FPA; and
      commanding the PFD to render a third symbol indicating the predicted speed (PS) on an airspeed indicator responsive thereto.

4. The method of claim 3, further comprising:
   at the control module,
   commanding the PFD to display an indicator for maximum cruise in the first designated area on the PFD when the FPA is more than a configurable predetermined upper margin above the max PPFP.

5. The method of claim 4, further comprising, at the control module, commanding the PFD to display an indicator for speed in the second designated area on the PFD when the FPA is more than a configurable predetermined upper margin above the max PPFP.

6. The method of claim 5, further comprising, at the PFD, rendering the indicator for maximum cruise within an amber background.

7. The method of claim 1, further comprising:
   determining, by the control module, when the FPA is more than a configurable predetermined lower margin below the idle PPFP; and
   when the FPA is more than a configurable predetermined lower margin below the idle PPFP,
      determining a predicted speed (PS) associated with the FPA; and
      commanding the PFD to render a third symbol indicating the predicted speed (PS) on an airspeed indicator responsive thereto.

8. The method of claim 7, further comprising:
   at the control module,
      when the FPA is more than a configurable predetermined lower margin below the idle PPFP,
      determining that the A/T mode is idle and the indicator for the A/T mode is an indication for idle; and
      commanding the PFD to display the indicator for idle when the FPA is more than a configurable predetermined lower margin below the idle PPFP.

9. The method of claim 8, further comprising, at the control module, commanding the PFD to display an indicator for speed in the second designated area on the PFD when the FPA is more than a configurable predetermined lower margin below the idle PPFP.

10. The method of claim 9, further comprising rendering the indicator for idle within an amber background.

11. An aircraft flight control system for use with a primary flight display (PFD), the system comprising:
    on-board sensors for providing sensor data comprising environmental data and sensed engine thrust data;
    a navigation system for providing inertial data comprising a flight path angle, attitude, and airspeed;
    a control module comprising a processor and a memory, the control module configured to:
      receive the sensor data;
      receive the inertial data;
      receive a target airspeed;
      process the inertial data, the sensor data, and the target airspeed, to determine (i) a maximum potential flight path (max PPFP), defined by a maximum thrust at the target airspeed, and an idle PPFP, defined by an idle thrust at the target airspeed; and
      generate display commands for symbolic indicators of (i) the flight path angle,
      (ii) the max PPFP and (iii) the idle PPFP;
      determine that the aircraft is in a speed controlled zone when the max PPFP is greater than the FPA, and the FPA is greater than the idle PPFP; and
      command the PFD to display an indicator of an auto-throttle (A/T) mode in a first designated area, and a status annunciation in a second designated area, when the aircraft is in the speed controlled zone; and
    a primary flight display (PFD) coupled to the control module and configured to receive the display commands and render symbology and indicators responsive thereto.

12. The system of claim 11, wherein the control module is further configured to:
    when the aircraft is in the speed controlled zone,
    determine that the A/T mode is active and that the indicator for the A/T mode is an indication for speed; and
    determine that the status annunciation is an indicator for cruise.

13. The system of claim 12, wherein the control module is further configured to:
    when the aircraft is not in the speed control zone,
    determine (a) when the FPA is more than a configurable predetermined upper margin above the max PPFP;
    determine (b) when the FPA is more than a configurable predetermined lower margin below the idle PPFP;
    in response to one of the conditions (a) and (b),
       determine a predicted speed (PS) associated with the FPA; and
       command the PFD to render a third symbol indicating the predicted speed (PS) on an airspeed indicator responsive thereto.

14. The system of claim 13, wherein the control module is further configured to command the PFD to display an indicator for maximum cruise in the first designated area when the FPA is more than a configurable predetermined upper margin above the max PPFP.

15. The system of claim 14, wherein the control module is further configured to command the PFD to display an indicator for speed in the second designated area when the FPA is more than a configurable predetermined upper margin above the max PPFP.

16. The system of claim 15, wherein the control module is further configured to render the indicator for maximum cruise within an amber background.

17. The system of claim 13, wherein the control module is further configured to command the PFD to display an indicator for idle in the first designated area when the FPA is more than a configurable predetermined lower margin below the idle PPFP.

18. The system of claim 17, wherein the control module is further configured to render the indicator for idle within an amber background.

19. A method for an aircraft flight control system for use with a primary flight display (PFD), the method comprising:
    at a control module, receiving sensor data comprising environmental data and sensed engine thrust data, from on board sensors;

receiving navigation data comprising a flight path angle, attitude, and airspeed, from a navigation system;

receiving a target airspeed;

processing the navigation data, the sensor data, and the target airspeed, to determine (i) a maximum predicted potential flight path (max PPFP), defined by a maximum thrust at the target airspeed, (ii) an idle PPFP, defined by an idle thrust at the target airspeed;

generating display commands for rendering (i) the flight path angle, (ii) the max PPFP and (iii) the idle PPFP;

defining an Auto-Throttle (A/T) speed controlled zone in which the max PPFP is greater than the FPA, and the FPA is greater than the idle PPFP;

determining when the aircraft is in the A/T speed controlled zone;

commanding the PFD to display an indicator for speed in a first designated area and an indicator for cruise in a second designated area on the PFD when the aircraft is in the A/T speed controlled zone; and when the aircraft is not in the A/T speed control zone,
determining (a) when the FPA is more than a configurable predetermined upper margin above the max PPFP;
determining (b) when the FPA is more than a configurable predetermined lower margin below the max PPFP;
in response to one of the conditions (a) and (b),
determining a predicted speed (PS) associated with the FPA; and
commanding the PFD to render a third symbol indicating the predicted speed (PS) on an airspeed indicator responsive thereto and at the primary flight display (PFD),
receiving the display commands and rendering indicators responsive thereto.

\* \* \* \* \*